(12) United States Patent
Grigsby et al.

(10) Patent No.: US 7,319,115 B2
(45) Date of Patent: Jan. 15, 2008

(54) ADHESIVES

(75) Inventors: Warren James Grigsby, Rotorua (NZ);
Charles Duff McIntosh, Rotorua (NZ);
Jeremy Martin Warnes, Rotorua (NZ);
Ian Douglas Suckling, Rotorua (NZ);
Charles Ross Anderson, Rotorua (NZ)

(73) Assignee: New Zealand Forest Research Institute Limited, Rotorua (NZ)

( * ) Notice: Subject to any disclaimer, the term of this patent is extended or adjusted under 35 U.S.C. 154(b) by 419 days.

(21) Appl. No.: 11/142,669

(22) Filed: Jun. 2, 2005

(65) Prior Publication Data

US 2006/0276570 A1 Dec. 7, 2006

(51) Int. Cl.
*C08L 97/02* (2006.01)
(52) U.S. Cl. .................... 524/72; 252/183.11
(58) Field of Classification Search .......... 524/72; 252/183.11
See application file for complete search history.

(56) References Cited

U.S. PATENT DOCUMENTS

| | | | |
|---|---|---|---|
| 4,034,012 A | 7/1977 | Gillern | 525/521 |
| 4,167,500 A * | 9/1979 | Jazenski et al. | 524/541 |
| 4,608,408 A | 8/1986 | Hood et al. | 524/15 |
| 5,858,553 A | 1/1999 | Wu | 428/524 |
| 5,912,317 A | 6/1999 | Wu | 528/129 |

OTHER PUBLICATIONS

Kreibich et al, Forest Prod Jour, vol. 37, No. 2, pp. 43-46, Feb. 1987, Condensed tannin-sulfonate derivatives in cold-setting . . . .
Gonzalez et al, Holz Als Roh- Und Werkstoff 54, 1996, pp. 389-392, Influence of preparation procedure on pine tannin . . . .
Laks et al, Jour of Wood Chem & Tech, 8(1), 1988, pp. 91-109, Condensed Tannins: Desulfonation of Hydroxybenzylsulfonic . . . .

* cited by examiner

*Primary Examiner*—Peter Szekely
(74) *Attorney, Agent, or Firm*—Jacobson Holman PLLC

(57) ABSTRACT

A hardener composition and pine bark tannin-containing resin composition are disclosed. The resin composition is formulated to neutral pH in order to reduce the extent of self-polymerisation and provide a satisfactory shelf life. The hardener composition may be mixed with a suitable resin, or the resin composition mixed with a suitable hardener to produce a cold set adhesive which is particularly useful for bonding wood.

30 Claims, 2 Drawing Sheets

ADHESIVES

TECHNICAL FIELD

This invention relates to adhesive bonding and, in particular, to a hardener composition and pine bark tannin-containing resin for use in the preparation of cold set adhesives especially suited to the bonding of wood articles.

BACKGROUND ART

Despite the development and availability of stronger and more rigid construction materials, wood is still widely used in a variety of utilitarian and decorative applications. Wood is plentiful and is a renewable natural resource with consumer appeal due to aesthetic, economic and environmental factors.

The properties of wood may be modified in the production of wood products, for example: fingerjointed and laminated timber; plywood; laminated veneer lumber (LVL); particleboard; and other manufactured wood products. Adhesives are used in the production of all of these. Often these wood products have advantageous properties in comparison to wood because the production process permits the removal of defects. In addition, the products may be produced in larger dimensions than can be cut from a tree.

Some commonly used adhesives for wood products are derived from phenol-resorcinol-formaldehyde (PRF) resins. PRF-based adhesives have excellent durability and cure without the application of external heat. PRF resins are generally used in a two-part adhesive system with one of the parts usually being formaldehyde or paraformaldehyde (a more convenient, solid form of formaldehyde). Addition of formaldehyde to the PRF resin causes the resin molecules to crosslink and thus form the adhesive bond or "cure". Therefore, the formaldehyde component is often referred to as the "hardener" in such an adhesive system.

Both phenol and resorcinol are obtained from petrochemical sources. Replacement of some or all of these components in an adhesive system by materials sourced from a renewable, natural resource would have economic and environmental advantages.

Tannins have been used commercially for many years as a substitute for phenol-formaldehyde resins in reconstituted wood products. The tannin has predominantly been derived from quebracho and *Acacia* species [1], whereas pine bark tannin (PBT) has not been widely used. The use of extracts from pine bark in adhesives offers the potential to utilise a material which is currently used for horticultural applications, dumped or burnt.

A number of researchers have recognised that, in contrast to quebracho and *Acacia* tannin, the chemistry of the reaction of PBT with formaldehyde is more like that of resorcinol than phenol. Accordingly, PBT is expected to be a suitable substitute for some of the resorcinol in PRF resins.

To date, however, resins containing PBT have been of limited adhesive utility [2]. This is due to a number of factors including: extract variability; high viscosity; and poor adhesive strength due to low cross-linking density. In addition, the high reactivity of PBT with formaldehyde hardeners means that the prepared adhesive has a short potlife that is undesirable in industry.

Methods which have been investigated to overcome the difficulties identified above include modification of the adhesive formulation or new extraction techniques. For example, sulfite extraction of bark from *Pinus radiata* [3], the incorporation of ultrafiltration in the processing of the extracts [4], and the modification of tannin reactivity using acids to alter the pH [5, 6].

Pizzi and Gonzalez have noted that a completely new approach is required to overcome the problem of hardening and setting a tannin-resorcinol-formaldehyde resin if, indeed, " . . . such a problem can be completely overcome at all" [7].

To date, the most commonly used approach to the problem of limited potlife has been the use of "honeymoon" systems [8-11]. In such systems the resin is mixed and applied to one face of the joint to be bonded and the other part of the adhesive system, the hardener, is mixed and applied to the second face. When the joint is pressed together, the two components combine and the curing reaction is initiated. This is in contrast to a standard two-part adhesive system in which the resin and the hardener are mixed together prior to application.

A disadvantage of a honeymoon-type adhesive system is that it is more difficult to apply to commercial operations than a standard two-part adhesive system. For example, the preparation of the two components prior to application may require additional formulation or mixing steps.

Known honeymoon systems that utilise PBT require the tannin component to be at a highly alkaline pH [12]. This requires the hazardous and therefore undesirable use of caustic compounds in the gluing facility. In addition, once the highly alkaline tannin component used in such systems has been mixed, it remains usable for two to four hours at most. Batch mixing of the tannin component may therefore lead to wastage.

During the mid 1980s a group led by Kreibich in the U.S. developed a honeymoon system which consisted of a mixture of PBT and sodium hydroxide solution in one part and a mixture of PRF resin and paraformaldehyde hardener in the other [6, 8, 13]. The group reported that there was a viscosity increase upon addition of sodium hydroxide to the PBT and the solution remained workable for only three to four hours [8].

U.S. Pat. Nos. 5,858,553 5,858,553 [14] and 5,912,317 5,912,317 [15] disclose hardeners for use with resorcinol resins, some of which include tannins, comprising a monocyclic or bicyclic oxazolidine together with a base, a sorbent and water.

The base in the compositions of U.S. Pat. Nos. 5,858,553 and 5,912,317 is included to " . . . retard the reaction of oxazolidine with resorcinol resin". Thus, the use of a base increases the time before which the mixed adhesive gels and becomes unworkable. Inorganic bases such as alkali metal or alkaline earth hydroxides are preferred and may be mixed with the hardener or, preferably, premixed with the resorcinol resin.

A drawback associated with the addition of base to PBT-containing resin is that the base promotes self-polymerisation in the resin, leading to insoluble gel and thus reducing the shelf life. In addition, the chelation of some cations by tannin can lead to insoluble precipitates. The alternative approach, the addition of base to the resin immediately before addition of the hardener, requires an additional step in the formulation of the adhesive and exposes the user to the risks of handling caustic compounds.

Addition of a base to the hardener composition, in order to retard the hydrolysis reaction of the oxazolidine, is also undesirable. Basic conditions may favour the Cannizzaro reaction, an irreversible reaction in which formaldehyde disproportionates to methanol and formic acid.

Thus, neither the use of conventional hardener compositions nor of honeymoon systems readily provides an adhesive based on PBT that meets industry standards and can be used in standard gluing techniques and with standard equipment.

It is therefore an object of the present invention to provide a PBT-containing resin and hardener composition that go some way towards overcoming the above disadvantages or at least provides the public with a useful choice.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

In a first aspect, the present invention provides a hardener composition comprising: 2-amino-2-(hydroxymethyl)-1,3-propanediol or a functional equivalent thereof; formaldehyde; one or more solvents; and water; wherein the hardener composition has a neutral pH.

Preferably, the solvent comprises poly(ethylene glycol) or a mixture thereof, or 1,2-ethanediol (ethylene glycol).

In one embodiment, the hardener composition further comprises a viscosity modifier.

The hardener composition may further comprise a filler.

In a preferred embodiment, the hardener composition comprises, by weight: 36% 2-amino-2-(hydroxymethyl)-1, 3-propanediol; 18% paraformaldehyde; 27% ethylene glycol; and 19% water.

In a further aspect, the present invention provides a process for preparing a hardener composition of the invention comprising:
(a) mixing paraformaldehyde with water;
(b) adding one or more solvents; and finally
(c) adding 2-amino-2-(hydroxymethyl)-1,3-propanediol or a functional equivalent thereof.

In an alternative embodiment, the present invention provides a process for preparing a hardener composition of the invention comprising:
(a) mixing paraformaldehyde with water;
(b) adding 2-amino-2-(hydroxymethyl)-1,3-propanediol or a functional equivalent thereof; and finally
(c) adding one or more solvents.

In a still further aspect, the present invention provides a hardener composition when prepared by a process of the invention.

In another aspect, the present invention provides a resin composition comprising: pine bark tannin (PBT); a suitable phenol-resorcinol-formaldehyde (PRF) resin; and one or more diluents or solvents; wherein the composition has a neutral pH.

Preferably, the PBT is extracted from the bark of *Pinus radiata*.

Preferably, the diluent or solvent comprises water.

In a preferred embodiment, the resin composition comprises, by weight: 24.6% PBT; 47.5% water; 1.5% of 40% aqueous sodium hydroxide; 24.6% PRF resin solids; and 1.8% citric acid.

In another aspect, the present invention provides, a process for preparing a resin composition of the invention comprising the steps of:
(a) dissolving PBT in one or more diluents or solvents;
(b) adjusting the pH of the PBT solution to between about 8.0 and about 8.5 with a suitable base;
(c) adding a suitable PRF resin; and
(d) after a suitable time, adjusting the pH of the resin to neutral with a suitable acid.

In another aspect, the present invention provides a resin composition when prepared by a process of the invention.

In another aspect, the present invention provides a use of a hardener composition of the invention and a suitable resin in the preparation of an adhesive.

In another aspect, the present invention provides a use of a resin composition of the invention and a suitable hardener in the preparation of an adhesive.

In another aspect, the present invention provides a use of a hardener composition of the invention and a resin composition of the invention in the preparation of an adhesive.

In another aspect, the present invention provides an adhesive comprising a resin and a hardener, wherein the resin is a resin composition of the invention and/or the hardener is a hardener composition of the invention.

In another aspect, the present invention provides a method of bonding articles which comprises gluing said articles with an adhesive of the invention.

In another aspect, the present invention provides a composite comprising two or more parts glued together using an adhesive of the invention.

Preferably, the parts are composed of cellulose. More preferably, the parts are composed of wood.

Although the present invention is broadly as defined above, those persons skilled in the art will appreciate that the invention is not limited thereto and that the invention also includes embodiments of which the following description gives examples.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DETAILED DESCRIPTION OF THE INVENTION

Figure 1:
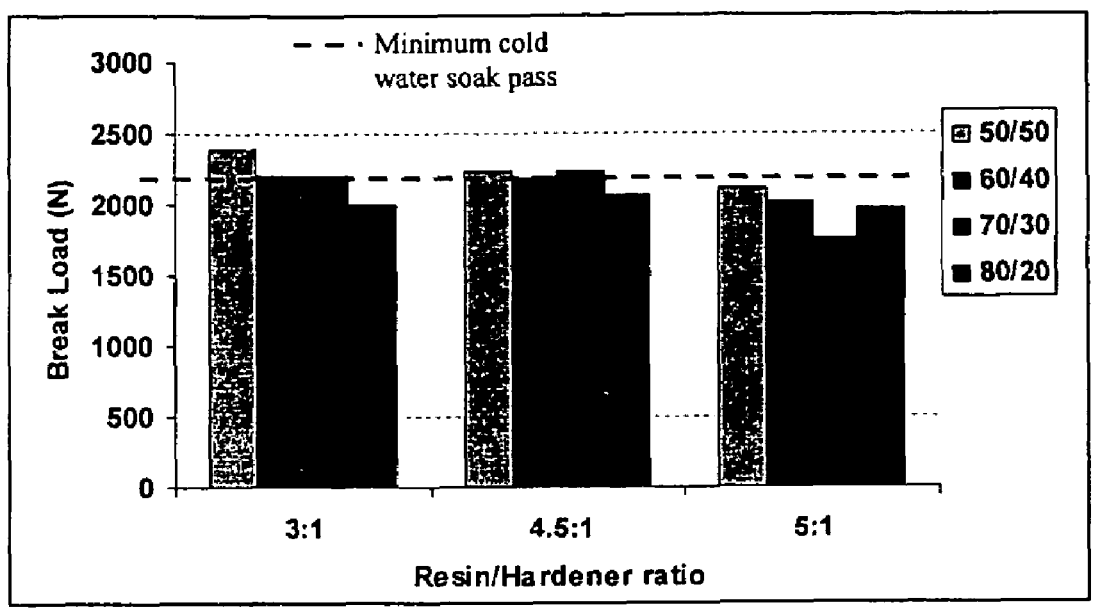
FIG. 1 is a graph of the cold water soak beech slip results for adhesives with varying "Y" hardener and tannin contents.

The present invention is broadly directed to hardener compositions, pine bark tannin-containing resins and their preparation and use in adhesives.

Accordingly, in one aspect, the present invention provides a hardener composition comprising: 2-amino-2-(hydroxymethyl)-1,3-propanediol (tris buffer, also known as tris(hydroxymethyl)aminomethane or tromethamine) or a functional equivalent thereof; formaldehyde; one or more solvents; and water; wherein the hardener composition has a neutral pH.

Reaction of 2-amino-2-(hydroxymethyl)-1,3-propanediol with formaldehyde yields a mono-oxazolidine compound and/or its bicyclic analogue. The reaction is reversible with acidic pH and elevated temperature accelerating the reverse reaction i.e. the hydrolysis of the oxazolidine to release formaldehyde and 2-amino-2-(hydroxymethyl)-1,3-propanediol.

It will be appreciated by those skilled in the art that functional equivalents of 2-amino-2-(hydroxymethyl)-1,3-propanediol or mixtures thereof may be used in the hardener composition. For example, analogues of 2-amino-2-(hydroxymethyl)-1,3-propanediol, in which a pendant hydroxymethyl substituent has been replaced by alternative alkyl, aryl or organic functional groups known to those in the art, may react in a similar manner to that described above. Similarly, analogues in which the methylene groups of 2-amino-2-(hydroxymethyl)-1,3-propanediol are each independently substituted by one or two hydroxyl, branched or straight chain alkyl or branched or straight chain hydroxyl alkyl groups may react in a similar manner. All such analogues and mixtures thereof are contemplated within the scope of the present invention. Accordingly, references to 2-amino-2-(hydroxymethyl)-1,3-propanediol are to be taken as also incorporating such functionally equivalent analogues and mixtures.

The oxazolidine produced by the condensation of 2-amino-2-(hydroxymethyl)-1,3-propanediol with formaldehyde reacts with a suitable resin to form an adhesive bond.

The molar ratio of 2-amino-2-(hydroxymethyl)-1,3-propanediol to formaldehyde in the hardener composition is generally about 1:2 i.e. the stoichiometric ratio of the two compounds in the reaction to form a bicyclic oxazolidine. This corresponds to a mass ratio of approximately 2:1.

However, the molar ratio of 2-amino-2-(hydroxymethyl)-1,3-propanediol to formaldehyde in the hardener composition may be varied, with the ratio preferably being between about 1:3.5 and about 1:1.2, more preferably between 1:2.5 and 1:1.5. If an amount of 2-amino-2-(hydroxymethyl)-1,3-propanediol exceeding these limits is used in the hardener composition, then rapid reaction occurs upon mixing with the resin leading to poor adhesive bond performance. Furthermore, excess paraformaldehyde may lead to a slower reaction together with unacceptably long cure times and poor adhesive bond performance.

Without wishing to be bound by any particular theory it is believed that the solvent acts as a wetting agent and aids the interaction of the resulting adhesive with the substrate.

A suitable class of solvents for use in the hardener compositions of the invention is poly(ethylene glycols) and ethylene glycol. Poly(ethylene glycols) can be obtained as polymer fractions which contain polymers with a narrow range in their number of monomer units and, therefore, molecular weight. As the molecular weight of the poly(ethylene glycol) used in the hardener composition increases, the strength of the cured adhesive formed from a mixture of the hardener composition and a suitable resin is observed to decrease. Thus, a preferred solvent is 1,2-ethanediol (ethylene glycol).

Other solvents that may be used include, but are not limited to: alcohols; polyvinyl alcohols; and other wetting agents or suitable additives known in the art.

Formaldehyde can react reversibly with ethylene glycol to form 2-(hydroxymethoxy)ethanol (a hemiacetal) or 1,3-dioxolane (an acetal). Carbon-13 nuclear magnetic resonance spectroscopic analysis of the currently preferred hardener composition (hereinafter defined) indicates that the extent to which either of these reactions occurs is minimal. Thus, without wishing to be bound by any particular theory, it is believed that ethylene glycol does not combine with formaldehyde in the currently preferred hardener composition but aids the wetting of the adhesive on the surface of the article to be glued and the dispersion of the hardener within the resin.

Water acts as a fluid carrier in the formulation of the hardener composition and is generally used in an amount sufficient to retain all components in solution.

The hardener composition may optionally include a viscosity modifier where it is desirable to thicken the hardener composition or the adhesive formed upon mixing the hardener with a suitable resin.

Suitable viscosity modifiers for use in the hardener composition include, but are not limited to: carboxymethylcellulose; hydroxyethyl cellulose; hydroxypropyl cellulose; methyl cellulose; polyols; acrylics; and variously hydrolysed polyvinyl acetates.

Preferably, the viscosity modifier is an acrylic or acrylic solution. In one embodiment, the viscosity modifier is a carboxylated acrylic copolymer emulsion, such as TEXICRYL® 13-302.

Other additives may also be included in order to modify the properties of the hardener composition. These include, but are not limited to fillers, for example: clays; silicates; diatomaceous earth; nut flours; bark flours; and cereal flours.

In one embodiment, the filler is preferably selected from the group consisting of: macadamia nut shell flour; walnut shell flour; coconut shell flour; olive stone flour; and other equivalents as are well known in the art. More preferably, the filler is macadamia nut shell flour.

In one embodiment, the filler preferably comprises about 5 to about 40% by weight of the hardener composition, more preferably 15 to 30% by weight.

The present applicants have determined that, contrary to conventional wisdom, formulating the hardener at an alkaline pH is not essential for satisfactory adhesive performance. Omission of a base from the hardener composition advantageously retards the disproportionation of formaldehyde. The hardeners of the present invention and adhesives incorporating same are, therefore, formulated at neutral pH.

Neutral pH as used herein means a pH of between about 6.5 and about 8.0; preferably between 6.7 and 7.6; more preferably between 6.9 and 7.2; and still more preferably 7.0.

The proportions of the components of the hardener composition may be varied within the limits of solubility and such limits are readily discernable by those skilled in the art.

In one embodiment a hardener composition of the invention comprises, by weight: about 25 to about 50%, preferably 26 to 46%, 2-amino-2-(hydroxymethyl)-1,3-propanediol; about 5 to about 30%, preferably 8 to 28%, paraformaldehyde; about 15 to about 40%, preferably 17 to 37%, of one or more solvents; and about 5 to about 40%, preferably 9 to 29%, water A preferred hardener composition comprises, by weight:

| | |
|---|---|
| 2-amino-2-(hydroxymethyl)-1,3-propanediol | 36% |
| paraformaldehyde | 18% |
| ethylene glycol | 27% |
| water | 19% |

When present, the viscosity modifier will generally comprise less than about 10% by weight of the hardener composition. However, those persons skilled in the art will appreciate that the amount of viscosity modifier incorporated in the hardener composition will depend upon the proportions of the other compounds present and the nature of the particular viscosity modifier.

The present invention also provides processes for preparing a hardener composition of the invention comprising mixing the components together.

Accordingly, in a further aspect, the present invention provides a process for preparing a hardener composition of the invention comprising the steps of:
(a) mixing paraformaldehyde with water;
(b) adding one or more solvents; and finally
(c) adding 2-amino-2-(hydroxymethyl)-1,3-propanediol.

In an alternative embodiment, paraformaldehyde is mixed with water as a first step, 2-amino-2-(hydroxymethyl)-1,3-propanediol is then added and finally one or more solvents are added.

It will be appreciated by those skilled in the art that, instead of mixing paraformaldehyde with water, formalin solution may be used in a process of the invention.

In a still further aspect, the present invention provides a hardener composition when prepared by a process of the invention.

In a yet further aspect, the present invention provides a pine bark tannin-containing resin composition comprising pine bark tannin (PBT), a suitable phenol-resorcinol-formaldehyde (PRF) resin; and one or more diluents or solvents; wherein the composition has a neutral pH.

The PBT component of the composition may be any suitable PBT extract known in the art. Suitable extracts are obtained, for example, by extraction with water [16, 17], alcohol or by extraction with a supercritical fluid such as water, carbon dioxide or ammonia. Preferably the PBT is extracted from the bark using water.

Various additives may be used in the extraction liquid such as: alkali metal sulfites; bisulfites; sulfite/carbonate [1, 8]; sulfite/urea; or sulfite and other nucleophiles [18].

The PBT extract may be prepared by adding sodium sulfite and urea to an aqueous extraction liquid. More preferably, sodium sulfite (about 2% w/w, based on air dry bark weight) and urea (about 2% w/w, based on air-dry bark weight) are added to the bark during the extraction process.

The dilute tannin extract may be concentrated prior to use in a resin composition of the invention using techniques known to those in the art, for example: vacuum distillation; or rising, falling and climbing film evaporation. The dilute tannin extract may conveniently be spray-dried to form a powder, which is then used to prepare a resin composition of the invention.

The PBT used in the resin composition of the invention is generally extracted from the bark of *Pinus, Picea* and/or other species predominantly containing phloroglucinolic tannins. Preferably, the PBT is extracted from the bark of *Pinus radiata*.

PRF resins for use in adhesives are also well known [1, 19]. Such resorcinolic resins are also known as resorcinol-containing thermoset resins. Suitable PRF resins for use in the compositions of the invention have a resorcinol content in the range from about 5 to about 50% and are well known to those skilled in the art.

As discussed above, the use of tannin and in particular PBT, as a substitute or partial substitute for resorcinol in PRF resins is economically desirable.

Accordingly, the ratio of PBT solids to PRF solids used in resin composition of the present invention is between about 5:95 and about 95:5; more preferably between 20:80 and 80:20; still more preferably between 30:70 and 70:30; yet more preferably between 40:60 and 60:40; and even more preferably 50:50.

Diluents or solvents suitable for use in the resin composition of the present invention are those which dissolve the resin and tannin solids to give a suitable viscosity. Generally the diluent or solvent used is water.

Other co-solvents or diluents may be included in the resin composition of the present invention. Such solvents include, but are not limited to: alcohols; glycols; and polyols.

In one embodiment a resin composition of the invention comprises, by weight: about 20 to about 40%, preferably 25 to 38%, PBT; about 10 to about 30%, preferably 12 to 25%, PRF solids; and about 40 to about 60%, preferably 45 to 55%, water.

Generally the resin composition will be formulated so that total solids are in the range of about 40 to about 60%, preferably 45 to 55% by weight.

A preferred PBT-containing resin comprises, by weight:

| | |
|---|---|
| Tannin | 24.6% |
| Water | 47.5% |
| 40% sodium hydroxide | 1.5% |
| PRF resin solids | 24.6% |
| Citric acid | 1.8% |

The present applicants have determined that, contrary to conventional wisdom an alkaline pH is not essential to satisfactory bond performance for a PBT-based adhesive. Having the PBT-containing resin at about neutral pH advantageously retards the self-polymerisation of the PBT present and means that the resin has a useful shelf life. The resin compositions of the present invention are, therefore, formulated to neutral pH.

In another aspect, the present invention provides a process for preparing a resin composition of the invention comprising the steps of:
(a) dissolving PBT in one or more diluents or solvents;
(b) adjusting the pH of the tannin solution to between approximately 8.0 and 8.5 with a suitable base;
(c) adding a suitable PRF resin; and
(d) after a suitable time, adjusting the pH of the resin to neutral with a suitable acid.

Generally the pH of the resin will be adjusted to neutral within an hour of adding the PRF resin.

The PBT, PRF resin and solvent(s) employed in the process are all as discussed above.

Bases suitable for use in the process of the invention include, but are not limited to, inorganic bases well known in the art. Preferably, the base is an alkali metal hydroxide or an alkali metal carbonate. More preferably, the base is sodium hydroxide.

Acids suitable for use in the process of the invention include, but are not limited to, mineral and organic acids well known in the art.

Examples of suitable mineral acids include, but are not limited to, hydrochloric acid and sulfuric acid.

Without wishing to be bound by any particular theory it is believed that the use of organic acids may confer some buffer properties on the resin. In addition, it is believed that solvation effects are such that organic acids stabilise the resin or tannin molecules in solution. Furthermore the use of organic acids is believed to reduce the tendency of the tannins to form colloids.

Preferably, the acid is an organic acid, for example: citric acid; tartaric acid; oxalic acid; malic acid; and acetic acid. More preferably, the acid is citric acid.

Without wishing to be bound by any particular theory it is thought that some reaction may occur between PBT and PRF moieties at alkaline pH which improves the stability of the PBT-containing resin and the bonding performance of the mixed adhesive.

As noted above, adjusting the PBT-containing resin to neutral pH during a process of the invention advantageously enables longer storage of the resin, and extends the shelf life to a period normally associated with PRF thermoset resins.

Other additives may also be included in order to modify the properties of the PBT-containing resin. These include, but are not limited to: surfactants; defoamers; flow agents; and viscosity modifiers.

In another aspect, the present invention provides a resin composition when prepared by a process of the invention.

In another aspect, the present invention provides a use of a hardener composition of the invention and a suitable resin in the preparation of an adhesive.

A particularly suitable resin for use with a hardener composition of the invention is the PBT-containing resin of the invention. Other suitable resins are those for which formaldehyde acts as a hardener, which include but are not limited to: novalak; PRF resin; phenol-formaldehyde resin; resorcinol resin; resorcinol-formaldehyde resin; reactive extrusion resin containing phenol, resorcinol or tannin; tannin resin; tannin-formaldehyde resin; tannin-phenol-formaldehyde resin; and tannin-UFC (urea formaldehyde concentrate) resin.

In another aspect, the present invention provides a use of a resin composition of the invention and a suitable hardener in the preparation of an adhesive.

A particularly suitable hardener for use with the resin compositions of the invention is the hardener composition of the invention. Other suitable hardeners include, but are not limited to powdered and liquid formaldehyde-based hardeners well known in the art and the oxazolidine hardeners disclosed in U.S. Pat. Nos. 5,858,553 [14] and 5,912,317 [15].

When the PBT-containing resins of the invention are used with powdered and liquid formaldehyde-based hardeners, addition of a base to the hardener will generally be required in order to achieve satisfactory bond performance. Alternatively, a base may be added to the resin immediately prior to adhesive formulation.

However, when used with the hardeners of the invention, the PBT-containing resins of the invention will provide satisfactory adhesive performance at about neutral pH.

Another aspect of the present invention is an adhesive comprising a resin and a hardener, wherein the resin is a resin composition of the invention and/or the hardener is a hardener composition of the invention.

The adhesive is prepared by combining the hardener with the resin. Thus, prior to use, the two components of the adhesive, the hardener and the resin, are stored separately. Another aspect of the present invention is, therefore, a kit comprising a resin and a hardener in separate containers, wherein the resin is a resin composition of the invention and/or the hardener is a hardener composition of the invention. In practice, the kit components are mixed prior to use.

The composition of both parts of the adhesive system may vary. The factors determining the composition of the hardener and resin include: the time in which curing is desired; the temperature used for curing; and the reactivities of the hardener and the resin.

The reactivity of the hardener will depend on the amount of the various ingredients used in its formulation. The reactivity of the resin will depend on the degree to which preliminary polymerisation between the resin components has occurred, the relative proportions of the different resin components and the final resin pH. Generally, the greater the proportion of tannin in the resin, the higher the reactivity.

The hardener will generally represent about 10 to about 60% by weight of the adhesive and the resin about 90 to about 40% by weight. Those persons skilled in the art can determine the appropriate composition for the adhesive system through routine experimentation.

In one embodiment, the hardener represents between about 15 to about 30% by weight of the adhesive, preferably 18 to 25% by weight.

Individual articles are often glued together in the construction, boat building and furniture industries. Gluing such articles together generally involves applying the adhesive to one or both articles and then applying and maintaining pressure until the adhesive has cured. Another aspect of the present invention is, therefore, a method of bonding articles which comprises gluing said articles with an adhesive of the invention.

The adhesives of the invention cure at room temperature. However, elevated temperatures, exposure to radio frequencies or microwave radiation may be employed to accelerate curing using techniques known to those in the art.

In addition, curing of those adhesives formed by addition of a paraformaldehyde hardener to a resin composition of the invention may be accelerated by the addition of ammonia directly to the composition or to the surfaces to be bonded as in the Greenweld™ process [20].

Another aspect of the present invention is a composite comprising two or more parts glued together using an adhesive of the invention. Preferably the parts are composed of cellulose. More preferably the parts are composed of wood. Examples of such wood composites include, but are not limited to: fingerjointed timber; laminated beams; wooden I-beams; laminated veneer lumber (LVL); particleboard; medium density fibreboard (MDF); oriented strand board (OSB); parallam; and plywood.

EXAMPLES

A spray dried urea/sulfite tannin extract (T) was blended with a commercially available phenol-resorcinol-formaldehyde (PRF) resin. Use of this blended resin (PRF/T) with a hardener composition of the invention ("Y" hardener, hereinafter defined) produced an adhesive which satisfied the requirements of the BS/EN1204 and JAS 111 Standards.

A laboratory fingerjointing trial was undertaken with this PRF/T combination resulting in glue bonds that met AS/NZS1491:1996 requirements of a service class 3 weather and boil proof (WBP) type I adhesive using either the formaldehyde/tannin-based adhesive with pH adjustment or by using "Y" hardener. With success in the laboratory trials, the tannin-based adhesive system was trialed on machinery typically used in a commercial fingerjointing operation. This trial used five different glue mix variables including two standard PRF mixes as controls and three tannin-based resins (PRF/T mixes) with different formaldehyde donating hardeners. The Greenweld™ process was also utilised in the trial.

Comparison of results from the fingerjoints prepared with laboratory and commercial equipment showed the combination of the PRF/T resin (pH 7) with the "Y" hardener gave adhesive performance comparable to that of the control PRF adhesive. When the PRF/T resins were used with formaldehyde-based hardeners a lower modulus of rupture (MOR) adhesive strength was obtained. For this adhesive system, an alkaline pH gives better performance with fingerjoints prepared with laboratory equipment, though the distinction between pH 7 and pH 8 in the fingerjointed timber prepared with commercial equipment was not as apparent.

Use of Greenweld™ to accelerate cure of the tannin-based adhesives led to some lower adhesive strength than joints formed without ammonia. Alkaline PRF/T (pH 8) with Greenweld™ had lower strength than the neutral (pH 7) adhesive.

Methodology (a) Materials

The tannin (T) was a spray-dried sulfite/urea extract from *Pinus radiata* bark. The phenol resorcinol formaldehyde (PRF) resin used was Sylvic R15. R15 and RP50 powdered paraformaldehyde hardener are both commercially available products from Orica Adhesives and Resins Ltd (Mt Maunganui, New Zealand). The SH13 liquid hardener and A185 PRF resin are commercially available products from Dynea (New Plymouth, New Zealand). The Zolidine hardeners ZT-65 and ZT-50 were obtained from Angus Chemicals through Polychem Marketing Limited (New Zealand). The thickening agents HEX (250HR), a hydroxy ethyl cellulose (HEC) solution, and TEXICRYL® 13-302, a carboxylated acrylic copolymer emulsion, were obtained from Orica ChemNet (Auckland, New Zealand). All other chemicals were obtained from Aldrich and used as received.

(b) Tannin Extraction

Pine bark was extracted using pilot plant counter-current extraction equipment supplied by Chem Eng Contracts (Melbourne, Australia) [16]. Sodium sulfite (2% w/w, based on air dry bark weight) and urea (2% w/w, based on air-dry bark weight) were added to the bark. 1.5 kg of bark was used per extraction cycle. For each extraction run, the extract liquor (Tank 5/6) was recycled up to ca. 16 extraction cycles after which 2 L of liquor from Tank 5/6 was fed forward with each additional cycle. Extract liquor was maintained at 95° C. and spray dried using a Niro laboratory-scale spray drier employing a 325/115° C. drying regime.

(c) PRF/Tannin Resin Formulation

Both the laboratory trial and the trial using commercial equipment used a PRF/T solution that was based on PRF resin and tannin 50/50 (w/w) reactive solids, where the tannin was dispersed in water and the pH adjusted with 40% sodium hydroxide prior to PRF resin addition. Mechanical stirring was used to mix the tannin into water to ensure thorough dispersion with no lump formation.

The PRF/T formulation of 50/50 solids was made up as follows:
1. Tannin, water and sodium hydroxide mixed at pH 8.5 for 15 minutes.
2. Add R15.
3. Adjust pH to 7 (or pH 8 depending on gluemix) after approximately 40 minutes (+/−5 minutes).

The PRF/T solution used for the trial on commercial equipment and for the laboratory trial was prepared according to the following composition:

| INGREDIENTS | MASS | % COMPOSITION |
|---|---|---|
| Tannin | 1401.1 g | 25.0 |
| Water | 1655.4 g | 29.6 |
| 40% NaOH | 85.7 g | 1.5 |
| R15 PRF resin | 2456.2 g (at 57% solids = 1400 g) | 43.9 |
| TOTAL | 5598.4 g | 100.0 |

Where:
 The R15 was taken as being 57% solids. The above mix thus gives a 1:1 PRF solids to tannin solids.
 The total solids (including sodium hydroxide) were 2835.4 g/5,598.3 g=50.65% PRF/T solids.
 The final pH of the PRF/T resin was adjusted by addition of citric acid.
 On 5,598 g approximately 100 to 105 g for pH 7.
 On 5,598 g approximately 60 to 70 g for pH 8.

(d) Hardener Formulation

"Y" hardener was prepared according to the following procedure:

At ambient temperature, ethylene glycol (27.3 g) and water (19.11 g) were mixed with paraformaldehyde (18.24 g) until the solid had completely dissolved. To the resulting solution was added 2-amino-2-(hydroxymethyl)-1,3-propanediol (35.6 g), and the blend mixed until thoroughly dispersed. The solution was then left for 24 to 48 hours to ensure that any remaining flocculation had dissolved.

"X" hardener was prepared by a similar procedure:

Ethylene glycol (18.2 g), water (18.2 g) and sodium hydroxide solution (40%, 10.01 g) were mixed until fully dispersed. Paraformaldehyde (18.24 g) was then added and the resulting mixture stirred until the solid had dissolved. 2-Amino-2-(hydroxymethyl)-1,3-propanediol (35.6 g) was then added, and the blend mixed until thoroughly dispersed.

Gel Time

The gel times of the glue mix was assessed by putting 10 g of fresh, thoroughly mixed glue into a test tube, and immersing the tube into a constant temperature water bath (20° C.±0.5°). A stirring wire in the glue mix was moved at frequent intervals until the end point gel occurred. The gel point was deemed to be when the test tube could be suspended from the stirring wire embedded in the glue for a period of at least 30 seconds.

Beech Slip Testing

Determination of the ultimate adhesive strength was tested in accordance to British Standard BS/EN1204 close contact cold water soak [21].

Each adhesive mix was applied to both laps with an open assembly time of 5 to 10 minutes and minimal closed assembly time. Slips were then placed in clamping jigs and pressed to 400 kPa gauge pressure (0.7 MPa glue line pressure). The beech slips were removed from clamps after 24 hours and left at 20° C. in a 12% equilibrium moisture content (EMC) room.

After 7 days curing, beech slips were tested dry, or after 24 hour cold soak, or 6 hour boil soak. The beech slips were tested in tension at 5 mm/minute using a Zwick 1445 Universal Testing machine. The failure load in newtons (N) was recorded and beech slips were then dried before evaluating wood failure.

Results

For these tests, adhesives were formed by mixing the blended PRF/T resin with either powdered or liquid hardener in a 10:1 resin solids to equivalent formaldehyde ratio. The results of the beech slip testing are shown in Table 1. Both "X" and "Y" hardeners attained the cold water soak pass mark of the Standard BS/EN1204 (2200 N). The presence of sodium hydroxide in the hardener did not impact on adhesive strength with "X" and "Y" hardeners having average break loads of 2256 and 2299 N, respectively. Furthermore, the "Y" hardener was tested after three weeks and no deterioration in performance was observed (2289 N). Formulation with a PRF/T at pH=7.6 gave similar bond strength as the PRF/T at pH=7.0.

TABLE 1

Beech Slip Testing of Hardeners

| Formulation | Gel Time (minutes) | Break Load (N) | Wood Failure (%) |
|---|---|---|---|
| tannin/PRF at pH 7.0 | | | |
| "X" hardener | 25 | 2256 | —[a] |
| "X" hardener (after 3 weeks) | | 2016 | 77 |
| "Y" hardener | 26 | 2299 | —[a] |
| "Y" hardener (after 3 weeks) | 28 | 2289 | 91 |
| RP50 | — | 2257 | 88 |
| Tannin/PRF at pH 7.6 | | | |
| "Y" Hardener | 25 | 2279 | 95 |
| RP50 | | 2150 | 61 |

Note:
[a] = not recorded

Jas-111 Soak Tests

Twenty laminates (each 600 mm×105 mm×105 mm) were glued using either R15 or PRF/T adhesives. There were two laminate assemblies for each adhesive. Each laminate consisted of three lamellae (600 mm×105 mm×35 mm). The three lamellae were glued (in a Taylor clamp) at 0.7 MPa using a target glue spread of 300 g/m² (mean double glue-line).

Japanese Agricultural Standard for Structural Glued Laminated Timber Notification No. 111 29/1/96 (Effective 29 Jun. 1996) describes test methods for determining resistance to delamination of adhesive bonds in glued laminated structural timber [22]. Two methods were used to assess the adhesives, boiling water soak delamination and vacuum-pressure delamination tests, described below.

(a) Vacuum-Pressure Delamination Test

Twenty samples were prepared after 7 days curing at 23° C. (two from each laminate, each 75 mm long) and were weighed before being placed in water and restrained with steel bars to keep them submersed. A vacuum of −75 kPa (gauge) was held for 5 minutes and then a pressure of 550 kPa was applied for 1 hour. This cycle was repeated and the samples were re-weighed before stacking them in a kiln vertically with the faces parallel, end-grain surfaces perpendicular to the airflow and spaced at least 50 mm apart. The samples were "dried" for 24 hours at 40° C., re-weighed and inspected for delamination. This entire process was repeated and delamination was measured in accordance with JAS 111 requirements after the final cycle and expressed as a percentage of the end glue-lines.

(b) Boiling Water Soak Delamination

Twenty samples (two from each laminate, each 75 mm long) were immersed in boiling water for 4 hours and then cooled in water (20° C.) for one hour. The samples were dried in a kiln at 70° C. with an airflow of 3 meters per second for 24 hours (until samples reached their original mass). The test specimens were put through two cycles of this boiling water soak and drying regime. Glue-lines from both end surfaces of each test specimen were examined before and after the test for delamination. Delamination was recorded for each glue-line and the percentage calculated on the length of the glue-line.

Results

Laminated posts using radiata pine were glued up and tested to the JAS Lamination Standard JAS 111 in order to test the performance of the "X" and "Y" hardeners and to compare their performance to that of the commercial Zolidine products. The results of the testing are shown in Table 2. The results of cold water vacuum pressure soaking revealed glueline delamination in all JAS blocks except those glued using the "Y" hardener. Considerable delamination was observed with the ZT-65/PRF/T glued samples (66%) whereas between 14 and 22% delamination was observed for the two adhesives using ZT-50 hardener and the adhesive formed with "X" hardener. Only the PRF/T/hardener "Y" adhesive having 0% delamination passed the JAS 111 Standard.

Shear block testing (dry) showed the five adhesives evaluated had satisfactory shear stress and excellent wood failure (Table 2). Average shear strength ranged between 11.2 and 14.2 MPa and the % wood failure for the samples exceeded 90%.

TABLE 2

Results of JAS testing (Vacuum-Pressure Soak) and Shear Block Testing

| Adhesive | Resin/ Formaldehyde Ratio (w/w) solids | Delamination (% of Glueline) | | Shear Test Shear Stress (MPa) | | Wood Failure (%) |
|---|---|---|---|---|---|---|
| | | Average | Std. Dev. | Ave. | Std. Dev. | |
| ZT-50 + PRF (R15) | 9:1 | 22.3 | 14.4 | 11.70 | 1.36 | 95 |
| ZT-65 + PRF/T | 8:1 | 65.7 | 25.1 | 12.51 | 0.97 | 94 |

TABLE 2-continued

Results of JAS testing (Vacuum-Pressure Soak) and Shear Block Testing

| Adhesive | Resin/ Formaldehyde Ratio (w/w solids) | Delamination (% of Glueline) | | Shear Test | | Wood Failure (%) |
|---|---|---|---|---|---|---|
| | | Average | Std. Dev. | Shear Stress (MPa) Ave. | Std. Dev. | |
| ZT-50 + PRF/T | 8:1 | 22.3 | 17.2 | 11.22 | 1.06 | 94 |
| "X" + PRF/T | 8:1 | 14.2 | 19.5 | 14.23 | 1.30 | 91 |
| "Y" + PRF/T | 8:1 | 0.0 | 0.0 | 11.86 | 0.51 | 96 |

Approximately 4:1 (w/w) resin/hardener formulations.

Fingerjointing Trials (a) Glue Mix Formulation

For the fingerjointing trials glue mixes were formulated using an appropriate formaldehyde equivalence ratio such that the amount of formaldehyde delivered to form the adhesive was constant, based on resin solids.

The glue mix formulations were:

| | MIX RATIO |
|---|---|
| Control-PRF R15 and Dynea SH13 | 2.94:1 (100 g PRF to 34 g SH13) |
| PRF/T at pH 8.0 with SH13 | 2.94:1 (100 g PRF/T to 34 g SH13) |
| PRF/T at pH 7.0 with SH13 | 2.94:1 (100 g PRF/T to 34 g SH13) |
| PRF/T at pH 7.0 with hardener "Y" | 3.57:1 (100 g PRF/T to 28 g "Y") |
| PRF A185 with SH13 | 5:1 (100 g PRF to 20 g SH13) |

(b) Laboratory Fingerjoint Testing

Test fingerjoints were made in the laboratory prior to using the glue mixes in the trial with commercial equipment, and were tested using American Standard Test Method (ASTM) D ASTM 4688-95. Standard Test Methods for Evaluating Structural Adhesives for Fingerjointing Lumber [23]. The procedure used was as follows:

Timber shooks 90×45 mm cross section, 500 mm long and of matched density and growth ring orientation were selected. These shooks were profiled with 10 mm Eric Paton cutters on an Eichmann laboratory fingerjointer. Glue was manually applied and the joints squeezed up at 7 MPa in a laboratory fingerjoint press. The glued samples were then cured at 20° C. for seven days before any testing was commenced. Before testing, each jointed sample length was reduced to 310 mm with the joint at the mid-point. Each of these sample lengths was then cut so as to yield nine 6.5 mm thin strips 45 mm wide and identified by the sample number and a "strip" number from 1 to 9. Strips 1, 4 & 7 were broken in tension dry (105 strips). Strips 2, 5 & 8 were subjected to a water soak vacuum/pressure treatment and then broken in tension while wet (105 strips). Strips 3, 6 & 9 were submitted to a 6 times boil and dry cyclic process before testing in tension while wet (105 strips). The total number of strips was 315. Failure load was evaluated and recorded in MPa. Wood failure was evaluated and recorded as a percentage. Failure mode classification was evaluated as prescribed in the Annex to ASTM D4688.

(c) Parameters for the Fingerjointing Trial with Commercial Equipment

The trial was conducted using a Lakeland single cutter block/single table fingerjointer running Eric Paton 10 mm cutters. The ambient climatic temperature at the time of the trial ranged from 8 to 15° C. The timber used during the trial was stored during the previous week, at maximum temperature of 7° C. and was ca. 7° C. to 9° C. at the time of the trial.

The trial consisted of five parts based on the combination of PRF/T and hardeners used as outlined below. Shooks were unmatched, 100×50 mm dry radiata pine (MC 10-14%) of variable length (400 to 900 mm). Green shooks were similarly unmatched and had been freshly milled. A Graco pump and an in-line mixer provided the glue mix for the first four parts of the trial. The Mill's own pump/in-line mixer provided the glue mix for part (v). Greenweld™ application utilised the standard Greenweld™ set up where ammonia solution was applied as a spray to the joint surface immediately prior to the joint being pressed. The length of jointed timber (stick) formed was 6 m.

(i) PRF R15 and Dynea SH13 Hardener Glue Mix (Control)

A glue mix made with R15 PRF resin and Dynea hardener SH13 was used as a control and also used to set up the machine. The PRF resin (R15) was used at its normal pH i.e. ca. 8.3 with a mix ratio of 2.94:1 (100 g PRF to 34 g SH13). The performance of the glue formed by this combination of resin and hardener was deemed satisfactory for testing purposes. During this step, dry shooks were jointed and glued (sticks A1 to A20). Near the end of this step dry shooks were glued using the Greenweld™ process (sticks B1 to B6). A total of 351 shooks were glued.

(ii) PRF/T at pH 8.0 with Dynea SH13 Hardener

This PRF/T glue mix (pH 8) was made with Dynea hardener SH13. The mix ratio was 2.94:1 (100 g PRF/T to 34 g SH13). The timber used was dry. During this part of the trial sticks C1 to C8 were determined (visually) to have variable glue cover, perhaps due to higher gluemix viscosity. The feed rate past the glue spreader was slowed to give better resin coverage on sticks C9 to C22. The Greenweld™ process was used on sticks D1 to D6. A total of 426 shooks were used. Sticks C1 to C8 were not used in testing.

(iii) PRF/T at pH 7.0 with Dynea SH13 Hardener

This run consisted of a mix of wet and dry shooks and Greenweld™ application. The PRF/T was at pH 7 and the mix ratio was 2.94:1 (100 g PRF/T to 34 g SH13). Sticks E1 to E12 were made with wet timber and were Greenweld™ jointed. Sticks F1 to F10 were made with dry timber and were Greenweld™ jointed. Sticks G1 to G12 were made with dry timber jointed with only the PRF/T SH13 mix. 480 shooks were jointed in this step.

(iv) PRF/T at pH 7 with Hardener "Y"

The mix ratio with this hardener was 3.57:1 (100 g PRF/T to 28 g "Y"). The timber used was dry. Sticks H1 to H20 were made with the "Y" hardener and sticks I1 to I3 were made with the Greenweld™ process.

(v) Dynea A185 PRF Resin and Dynea SH13 Hardener

The usual glue mix used on this fingerjointer is that formed with Dynea A185 PRF resin and SH13 hardener (100 g A185 PRF to 20 g SH13) and a short run of timber was glued with this adhesive system. This adhesive was used in conjunction with Greenweld™, producing sticks J1 to J10.

(d) Jointed Timber Storage

The processed timber was kept in a controlled 18 to 20° C. environment for at least seven days before testing took place.

(e) Jointed Timber Evaluation

Samples having satisfactory length either side of the joint were randomly cut from the sticks of jointed timber. These joints were then subjected to modulus of rupture (MOR) testing using the "third point bending test" method [24]. Results are presented with MOR (MPa) and wood failure (%).

Results and Discussion (a) Laboratory Adhesive Testing

Laboratory processing of the different adhesive systems was undertaken on fingerjoints and the results are shown in Table 3. Testing was done in accordance to ASTM 4688-95 and enabled comparisons of the PRF/T resin formulation with a control PRF resin (R15) as well as hardener type and PRF/T resin pH. Dry testing determined that three adhesive systems gave good results of comparable strength (ca. 44 MPa). They were the control PRF adhesive, PRF/T (pH 7) and "Y" hardener, and the PRF/T (pH 8) and SH13 hardener. A lower PRF/T resin pH or the use of powdered hardener RP50 gave lower adhesive strength (ca. 35 MPa).

Cold water vacuum pressure soak and the boil cycle testing similarly revealed differences between the five adhesives. Vacuum pressure soaking revealed relatively poor adhesive strength for the PRF/T (pH 7)/SH13 adhesive (9.2 MPa) compared to the other four adhesives (Table 3). PRF/T (pH 8) adhesives had break load values of ca. 15 MPa whereas the PRF/T resin cured with "Y" hardener and the control PRF had average adhesive strength values of 17.6 MPa. For boil testing, there was a clear distinction between the performance of both the control PRF (23.8 MPa) and "Y" cured (21.8 MPa) adhesives and the other three adhesives which had strength values between 15 and 16 MPa.

The results presented in Table 3 indicate the adhesive formed with PRF/T resin (pH 7) and the "Y" hardener will have similar performance to that of the control PRF adhesive. For the other PRF/T formulations, it appeared the PRF/T resin pH was critical in determining performance. The contrast in dry strength performance of the PRF/T (pH 8) adhesives cured with the liquid (SH13) and powdered (RP50) hardeners was unexpected, and may be related to the rapid gel time using the liquid hardener, compared to the dissolution rate of the powdered paraformaldehyde RP50 hardener.

TABLE 3

Laboratory prepared fingerjoint test results (MPa)

| GLUE MIX | | PRF/T SH13 (pH 7) | PRF/T SH13 (pH 8) | PRF/T "Y" (pH 7) | PRF/T RP50 (pH 8) | Control PRF (R15) |
|---|---|---|---|---|---|---|
| Dry Test | Average | 37.40 | 43.30 | 44.90 | 35.20 | 45.50 |
| | Stdev | 7.70 | 9.08 | 5.53 | 6.19 | 10.34 |
| Failure | Average | 3.80 | 4.00 | 5.10 | 2.80 | 5.10 |
| Mode | Stdev | 1.37 | 1.50 | 1.45 | 1.92 | 1.34 |
| Vacuum/ | Average | 9.20 | 15.20 | 17.70 | 15.10 | 17.60 |
| Pressure Soak | Stdev | 5.18 | 7.89 | 5.11 | 5.47 | 12.26 |
| Failure | Average | 1.50 | 2.00 | 2.90 | 2.00 | 4.10 |
| Mode | Stdev | 0.68 | 0.89 | 1.34 | 0.86 | 1.37 |
| Boil Cycle | Average | 15.20 | 16.10 | 21.80 | 16.60 | 23.80 |
| | Stdev | 3.51 | 2.98 | 4.96 | 4.96 | 4.65 |
| Failure | Average | 2.20 | 3.10 | 3.80 | 2.50 | 4.30 |
| Mode | Stdev | 0.77 | 1.26 | 0.89 | 0.81 | 1.45 |
| Samples (×3 Strips) | | 1 to 7 | 8 to 14 | 15 to 21 | 22 to 28 | 29 to 35 |

(b) Fingerjointing Trial with Commercial Equipment

For each adhesive combination, several hundred fingerjoints were formed. From each series of fingerjointed timber, sample boards were selected and then broken in a "third point bending test" to determine modulus of rupture (MOR) [24]. Results are summarised in Table 4.

TABLE 4

Results of modulus of rupture (MOR) testing of fingerjoints prepared with commercial equipment

| | Description | Average MOR (MPa) | Stdev | Range MOR (MPa) | Wood Failure (%) | Stdev | No. tested* |
|---|---|---|---|---|---|---|---|
| A | R15/SH13 | 40.7 | 8.7 | 59.11-30.57 | 93 | 12.9 | 16 |
| B | R15/SH13/GW | 24.0 | 4.8 | 31.29-16.09 | 60 | 23.9 | 12 |
| C | PRF/T/SH13 (pH 8) | 32.7 | 6.7 | 47.75-20.71 | 77 | 19.3 | 16 |
| D | PRF/T/SH13 (pH 8)/GW | 17.8 | 4.7 | 24.75-9.69 | 18 | 18.8 | 14 |
| E | PRF/T/SH13 (pH 7)/GW | 14.9 | 10.4 | 29.07-2.89 | 18 | 26.1 | 16 |
| F | PRF/T/SH13 (pH 7)/GW | 22.0 | 2.9 | 25.36-14.76 | 53 | 30.7 | 13 |
| F | As above dried at 40° C. | 18.5 | 6.5 | 21.71-18.06 | 37 | 18.6 | 5 |
| G | PRF/T/SH13 (pH 7) | 28.3 | 4.1 | 34.42-19.55 | 75 | 31.1 | 15 |
| H | PRF/T/"Y" (pH 7) | 31.7 | 6.3 | 42.79-20.86 | 83 | 23.4 | 16 |
| H | (retest) | 39.1 | 5.1 | 49.11-26.77 | 93 | 9.9 | 20 |

TABLE 4-continued

Results of modulus of rupture (MOR) testing of fingerjoints prepared with commercial equipment

| Description | Average MOR (MPa) | Stdev | Range MOR (MPa) | Wood Failure (%) | Stdev | No. tested* |
|---|---|---|---|---|---|---|
| I PRF/T/"Y" (pH 7)/GW | 30.2 | | 30.64-24.63 | 68 | | 3 |
| J A185/SH13/GW | 37.9 | 7.4 | 47.83-25.75 | 89 | 19.4 | 17 |

GW = Greenweld ™; all samples dry timber except E which used wet timber. E was further kiln dried at 40° C.
*Note: A declared bending strength MOR result, for qualification purposes, requires at least 30 test results. For these tests, average, range and standard deviation are good indicators of acceptable bonds.

A benchmark bending strength performance of 40.7 MPa was determined for the R15/SH13 adhesive (A) which was the control in this trial. As well as the highest average MOR, the R15 resin/SH13 hardener combination had excellent wood failure (93%). Adhesive strength however was reduced when this adhesive was applied in conjunction with Greenweld™, lowering both the MOR (24.0 MPa) and % wood failure (60%). This drop in performance was surprising, given the state of this technology and may indicate the combination of the resin and hardener, which were produced by different manufacturers, may not have been optimal for use with Greenweld™.

For the PRF/T resin and hardener combinations, MOR testing revealed a range in adhesive performance from 39 MPa to ca. 15 MPa. Adhesive strength of ca. 33 MPa was obtained for the PRF/T/SH13 adhesive at pH 8 (C) whereas this adhesive at pH 7 had an MOR of 28.3 MPa (G). Combination of the PRF/T resin (pH 7) with the "Y" hardener (H) gave comparable MOR adhesive strength to the control (A). An initial average MOR value of 31.7 MPa was obtained for this adhesive, however examination of glue spread and squeeze out revealed inferior coverage to other adhesives evaluated and further testing of joints with visibly acceptable glue squeeze out gave the improved MOR value of 39.1 MPa. The glue spread problem was thought to be a result of the low viscosity and glue dripping off the joint before pressing. As a comparison, the second PRF resin evaluated A185 with SH13 hardener had a MOR of ca 38 MPa.

Comparison of results from the fingerjoints prepared with laboratory and commercial equipment has shown the combination of the PRF/T resin with the "Y" hardener gave adhesive performance comparable to that of the control PRF adhesive R15 with SH13 hardener.

Adhesive formed with PRF/T resin at pH 7 and "Y" hardener gave better performance than the adhesive formed from PRF/T resin at pH 8 with a paraformaldehyde-based hardener (SH 13).

Use of Greenweld™ to accelerate cure of the tannin adhesives led to lower adhesive strength than joints formed without ammonia. However, ammonia application may not have been optimal and reduced quantities may need to be investigated as the results indicate that curing may have been too rapid, limiting adhesive penetration and good bond development.

Conclusion

A tannin-based PRF/T resin containing equivalent proportions of tannin and PRF resin solids gave comparable performance to that of pure PRF resin in fingerjoints prepared with laboratory and commercial equipment.

Optimum glue mix formulation of a tannin-based adhesive required the "Y" hardener.

PRF/T resin pH with paraformaldehyde-based hardeners was critical when joints were subjected to cold water and boil soak testing.

Optimisation of the Adhesive Formulation (a) Variation of Tannin and Hardener Content Glue mixes with differing hardener and tannin content were prepared at the following ratios:

3.0:1=3.33 g of hardener "Y" with 10 g of tannin/PRF
4.5:1=2.22 g of hardener "Y" with 10 g of tannin/PRF
5.0:1=2.00 g of hardener "Y" with 10 g of tannin/PRF The tannin/PRF ratio was based on the mass ratio of tannin solids to PRF solids with the combined tannin/PRF resin having 50% total solids.

Results and Discussion

Adhesives were formulated with varying tannin contents in the PRF/tannin resin. The bond strength was determined using beech slip testing (FIG. 1 and Table 5). As discussed above, a successful tannin/PRF glue may be formulated from a 50/50 tannin/PRF composition having 50% reactive solids at a ratio of 3.75:1 with the formaldehyde free hardener "Y". However, the tannin content in the adhesive system may be increased. As shown in Table 5, satisfactory cold water soak adhesive strength (2200 N) and wood failure were obtained at tannin contents up to 70% tannin. The BS/EN1204 pass requirement for cold water soak is an average 2200 N break load. At a tannin/PRF ratio of 70/30 and a hardener ratio of 4.5:1 an average break load of 2238 N was obtained. At 80% tannin content the adhesive strength (ca. 2000 N) did not pass the minimum requirement (2200 N) at any of the hardener ratios. A contributing factor to the adhesive strength of the 80/20 adhesive system may be the short adhesive gel time (7 minutes) and insufficient wood surface wetting time.

As the tannin content increased, the pot life of the adhesive decreased (with "Y" hardener at 3.5:1). For an adhesive prepared from a resin with a tannin/PRF ratio of 80/20, the time to spread and close the slips was very short (approximately 4 minutes) and this may have contributed to thicker glue lines that were obvious on the slip after testing in tension. Noted gel times were:

50/50=25±1 minute
60/40=20±1 minute
70/30=13±1 minute
80/20=7±1 minute

The results from 6 hour boil soaks show that all the adhesives prepared (Table 5) passed the minimum requirement for BS/EN1204 (1800 N). There was little evidence of under-cure in the adhesives. Under-cure is characterised by a significant increase in adhesive strength over that observed for the cold water soak.

TABLE 5

Strength results for adhesives with varying "Y" hardener and tannin contents. Break loads are in N with percentage wood failure in brackets

| Tannin/PRF:Hardener ratio | Tannin/PRF ratio | | | |
|---|---|---|---|---|
| | 50/50 | 60/40 | 70/30 | 80/20 |
| | 24 hour cold water soak break load (N) | | | |
| 3:1 | 2391(91) | 2200(85) | 2197(92) | 2004(70) |
| 4.5:1 | 2230(95) | 2184(83) | 2238(82) | 2069(67) |
| 5:1 | 2107(68) | 2010(73) | 1748(68) | 1971(67) |
| | 6 hour boil soak break load (N) | | | |
| 3:1 | 2033(79) | 2182(79) | 1929(80) | 1937(78) |
| 4.5:1 | 2189(97) | 2011(93) | 1946(90) | 1825(56) |
| 5:1 | 2233(91) | 1971(93) | 2108(83) | 1896(80) |

At a resin/hardener ratio of 3:1, the 50/50 and 60/40 tannin/PRF adhesives passed the minimum 2200 N requirement while the 70/30 composition just failed to pass (2197 N). Similar results were achieved with RP50 hardener and formulation of the adhesive at pH 8.5 (see above). At a hardener ratio of 4.5:1 the cold water soak results show that the 50/50 and 70/30 formulations attain satisfactory adhesive strength but that the 60/40 formulation (2184 N) narrowly failed to pass the minimum requirement. None of the adhesives formed with a 5:1 hardener ratio had satisfactory cold water soak adhesive strength, indicating that the hardener content in these formulations was too low to form a durable adhesive. The adhesives formed with differing hardener content all passed the boil soak requirement (1800 N), however most of the 5:1 adhesives showed a slight increase in adhesive strength, possibly due to further curing and cross-linking taking place at elevated temperature.

(b) Variation of Hardener Composition

Hardeners were prepared based on "Y" hardener but having differing proportions of paraformaldehyde and 2-amino-2-(hydroxymethyl)-1,3-propanediol (tris) as set out below (Table 6). The quantity of hardener to tannin/PRF resin was varied in order to keep the paraformaldehyde to tannin/PRF ratio constant.

TABLE 6

Ratio of tris:paraformaldehyde in the hardener formulations

| | Tris:Paraformaldehyde Ratio | | | |
|---|---|---|---|---|
| | 1:2 | 1:2.5 | 1:3 | 1:3.5 |
| Ethyl Glycol (g) | 27.3 | 27.3 | 27.3 | 27.3 |
| Water (g) | 19.1 | 19.1 | 19.1 | 19.1 |
| Paraformaldehyde (g) | 18.2 | 22.5 | 26.5 | 31.0 |
| Tris (g) | 35.6 | 35.6 | 35.6 | 35.6 |
| Hardener (g) per 10 g of tannin/PRF | 2.8 | 2.4 | 2.1 | 1.85 |
| Gel time (min) at pH 8.5 | 25 | 16 | 13 | 12 |

Results and Discussion

Figure 2:
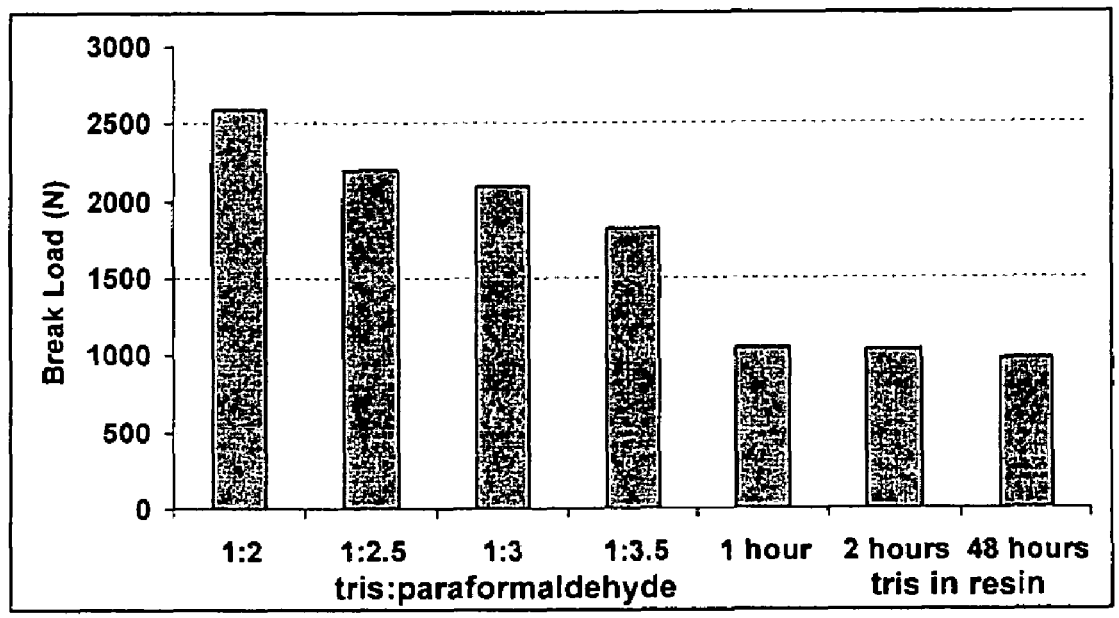
FIG. 2 is a graph of the cold water soak beech slip results for adhesives with differing tris to paraformaldehyde ratios in the hardener formulation and adhesives with tris added to the tannin/PRF resin.

Compositions based on the "Y" hardener formulation with varying 2-amino-2-(hydroxymethyl)-1,3-propanediol (tris) to paraformaldehyde ratios were evaluated, as was direct addition of tris to the tannin/PRF resin. The compositions prepared are set out below (Table 7). The results of adhesive testing using these hardener formulations are shown in Table 7 and FIG. 2.

TABLE 7

Strength results for adhesives with varying proportions of paraformaldehyde in the hardener compositions. Break loads are in N with percentage wood failure in brackets.

| | Modified "Y" Hardener (Tris:Paraformaldehyde) | | | |
|---|---|---|---|---|
| | 1:2.0 | 1:2.5 | 1:3.0 | 1:3.5 |
| Cold Water Soak | 2599(85) | 2199(79) | 2099(79) | 1825(44) |
| Boil Soak | — | 1859(78) | 2097(88) | 2229(93) |

Decreasing the tris to paraformaldehyde ratio from 1:2 to 1:2.5-1:3.5 led to progressively poorer adhesive performance. Formulation of the adhesives with tannin/PRF (50/50) was based on the same formaldehyde equivalence used for formulating adhesives with "Y" hardener, that is 3.75:1. The use of a hardener comprising tris and paraformaldehyde in a ratio of 1:2.5 gave a tannin/PRF adhesive which narrowly failed (2199 N) the cold water soak minimum (2200 N). Lower break loads of 2099 N and 1825 N were found for tris/paraformaldehyde ratios of 1:3 and 1:3.5 respectively. At the higher paraformaldehyde ratios formaldehyde emissions were also evident from these hardeners, suggesting that any residual formaldehyde did not lead to high conversion to the hemiacetal with ethylene glycol, which was also present in the hardener.

The direct addition of tris to the tannin/PRF resin was also investigated. However, poor break loads were recorded on adhesive formulation. This suggests tris must be present in the hardener not resin. These adhesives were formed with an ethylene glycol/formaldehyde hardener. The adhesives had rapid gel times and had cold water soak break loads of 1047 and 969 N respectively, with the 6 hour boil adhesive strength found to be 1712 and 1715 N respectively.

Hardener Viscosity Modifications

Formulation of hydroxy ethyl cellulose (HEC) and acrylic solutions in "Y" hardener formulations used HEC (250HR) at 0.5 and 0.75% and TEXICRYL® 13-302 at 3 and 5% respectively in the hardener. Included with these additions were Macadamia nut shell flour (MNSF) at 0, 15 and 30%. The various formulations trialed are set out below (Table 8). The resin to hardener ratio was 3.57:1 which corresponds to 28 g "Y" hardener to 100 g tannin/PRF resin. Accordingly, the amount of hardener was varied in order to keep the paraformaldehyde to tannin/PRF ratio constant.

TABLE 8

Weights (g) used to formulate hardeners containing HEC and acrylic solutions

| "Y" | | % MNSF | 0 | 15 | 30 | 0 | 15 | 30 |
|---|---|---|---|---|---|---|---|---|
| 27.30 | ethylene glycol | | 27.30 | 27.30 | 27.30 | 27.30 | 27.30 | 27.30 |
| 19.11 | water | | 19.11 | 19.11 | 19.11 | 19.11 | 19.11 | 19.11 |
| 18.24 | paraformaldehyde | | 18.24 | 18.24 | 18.24 | 18.24 | 18.24 | 18.24 |
| 35.60 | Tris | | 35.60 | 35.60 | 35.60 | 35.60 | 35.60 | 35.60 |
| | TEXICRYL ® 13-302 | | 3 | 3 | 3 | 5 | 5 | 5 |
| | MNSF | | 0.00 | 15.00 | 30.00 | 0.00 | 15.00 | 30.00 |
| 100.25 | Total | | 103.25 | 118.25 | 133.25 | 105.25 | 120.25 | 135.25 |
| | % mass increase | | 2.91 | 15.22 | 24.77 | 4.75 | 16.63 | 25.88 |
| | AMOUNT HARDENER | | 28.81 | 32.26 | 34.93 | 29.33 | 32.66 | 35.25 |
| | HEX 250 | | 0.50 | 0.50 | 0.50 | 0.75 | 0.75 | 0.75 |
| | MNSF | | 0.00 | 15.00 | 30.00 | 0.00 | 15.00 | 30.00 |
| | Total | | 100.75 | 115.75 | 130.75 | 101.00 | 116.00 | 131.00 |
| | % mass increase | | 0.50 | 13.39 | 23.33 | 0.74 | 13.58 | 23.47 |
| | AMOUNT HARDENER | | 28.14 | 31.75 | 34.53 | 28.21 | 31.80 | 34.57 |

Results and Discussion

Several viscosity modifiers were investigated in order to increase the viscosity of the "Y" hardener as low viscosity of the hardener may impact on the properties of the adhesive, for example by contributing to adhesive flow from vertical finger-jointed faces prior to pressing. A suitable modifier should give sufficient viscosity build in the narrow pH range of the "Y" hardener and not add significantly to the cost of hardener formulation. Therefore, the addition of hydroxy ethyl cellulose (HEC) or an acrylic solution to the "Y" hardener formulation was investigated.

TABLE 9

Physical Monitoring of hardeners formulated with viscosity modifiers

| | % MNSF | COMMENT |
|---|---|---|
| TEXICRYL ® (%) | | |
| 3 | 0 | Low viscosity, little glue mix viscosity increase. |
| 3 | 15 | Low viscosity, settles, re-mixes, slight glue mix viscosity increase. |
| 3 | 30 | Low viscosity, settles, re-mixes, more glue mix viscosity increase. |
| 5 | 0 | Slightly more viscosity than 3% and the same trend as the 3%. |
| 5 | 15 | Slightly more viscosity than 3% and the same trend as the 3%. |
| 5 | 30 | Slightly more viscosity than 3% and the same trend as the 3%. |
| HEC 250 HR (%) | | |
| 0.5 | 0 | Good viscosity, settles and glue mix clots. |
| 0.5 | 15 | Good viscosity, settles and glue mix clots. |
| 0.5 | 30 | Good viscosity, settles and glue mix clots worse. |
| 0.75 | 0 | Good viscosity, settles and glue mix clots. |
| 0.75 | 15 | Good viscosity, settles and glue mix clots. |
| 0.75 | 30 | Good viscosity, settles and glue mix clots worse. |

HEC and the acrylic solution, TEXICRYL®, were evaluated as viscosity modifiers by assessing the physical characteristics of respective hardener solutions and any distinction in beech slip performance. TEXICRYL® was added at 3 and 5% while HEC was added at 0.5 and 0.75% in conjunction with addition of macadamia nutshell flour (MNSF) at 0, 15 and 30% (w/w solids, Table 9). TEXICRYL® added at 5% gave satisfactory viscosity build and maintained adhesive bond strength as shown in Table 10. Note that the results in Table 10 are based on equivalent formaldehyde addition.

The formulations with HEC were found to clot, dropping out and settling with time, particularly in the presence of MNSF. This may account for the variability in adhesive performance that was observed. The clotting also impacted on viscosity measurements with variable viscosity apparent in the presence of MNSF (Table 10). Overall, the acrylic at 5% addition, with the hardener adjusted to pH 7 gave a hardener formulation which appeared to have the most stable viscosity with either 15 or 30% added MNSF.

TABLE 10

Cold water soak break loads for PRF/T (50/50) glue mixes containing viscosity modifiers in the "Y" hardener, with and without the addition of 30% MNSF

| TEXICRYL ® 13-302 | 0% | 3% | 3% + MNSF | 5% | 5% + MNSF |
|---|---|---|---|---|---|
| Break load (N) | 2599 | 2221 | 2240 | 2246 | 2264 |
| Viscosity (cP) 40 sec$^{-1}$ | 7 | 33 | 120 | 170 | 139 |
| Viscosity (cP) 1 sec$^{-1}$ | 1 | 49 | 98 | 163 | 147 |
| HEC 250 HR | 0.5% | 0.5% + MNSF | 0.75% | 0.75% + MNSF | |
| Break load (N) | 2321 | 2099 | 2437 | 2148 | |
| Viscosity (cP) 40 sec$^{-1}$ | 273 | 626 | 503 | 676 | |
| Viscosity (cP) 1 sec$^{-1}$ | 982 | 1032 | 2652 | 1375 | |

Conclusion

From the work undertaken to optimise the tannin/PRF glue mix formulation, it was found the tannin content in the tannin/PRF adhesives could be increased to at least 70% while achieving minimum pass requirements of the BS/EN1204 Standard beech slip test. In addition to satisfactory adhesive performance at 70% tannin, reduction in the amount of the PRF component offers the opportunity to reduce the cost of the final glue mix.

Evaluation of the hardener to resin ratio has established that a ratio of 4.5:1 (resin/hardener) can be used across a range of tannin contents while maintaining adhesive performance.

A suitable hardener viscosity modifier has been identified. The use of an acrylic solution gives a stable, higher viscosity "Y" hardener solution that provides satisfactory adhesive strength.

PRF/T Resin Stability

TABLE 11

Variation in cold water soak break loads (N) with time from resin formulation for tannin/PRF adhesives prepared with RP50 or "Y" hardener

| | Tannin/PRF ratio | | | | | | |
|---|---|---|---|---|---|---|---|
| | 50/50 | 50/50 | 50/50 | 50/50 | 40/60 | 60/40 | 50/50 |
| | | | | Resin Total Solids | | | |
| | 51% | 51% | 51% | 51% | 51% | 51% | 45% |
| | | | | Resin pH | | | |
| Days | pH 7.5 | pH 6.8 | pH 6.45 | pH 5.9 | pH 6.95 | pH 7.0 | pH 6.95 |
| 0 | 1699 | 996 | 624 | 418 | 974 | 909 | 1275 |
| 51 | 1725 | 1394 | 986 | 703 | 1410 | 1415 | 1195 |
| 91 | 1874 | 1770 | 1419 | 1427 | 1905 | 1572 | 1714 |
| 123 | 1684 | 1157 | 825 | 637 | 1442 | 1112 | 1381 |
| 157 | 1577 | 1020 | 840 | 686 | 1405 | 1207 | 1257 |
| 129 (Y) | 2450 | 2361 | 2316 | 2326 | 2480 | 2226 | 2362 |
| 151 (Y) | | 2290 | | | | | |

(Y) = formulated with "Y" hardener

Figure 3:
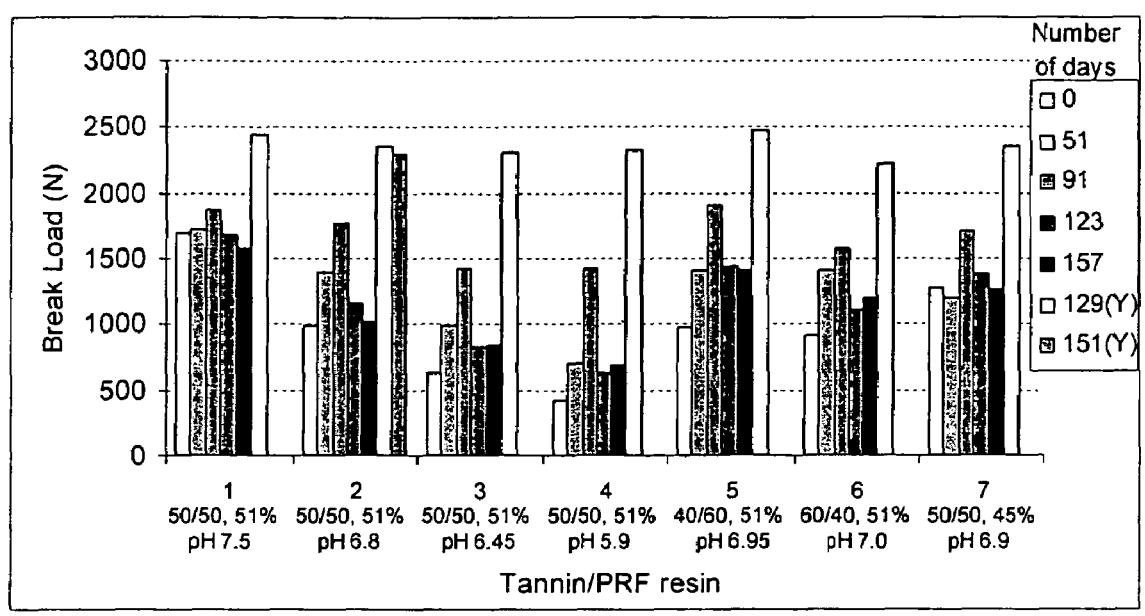
FIG. 3 is a graph of the variation in cold water soak beech slip results with time after resin formulation for tannin/PRF adhesives with powdered formaldehyde or "Y" hardener.

The variation in the strength of several PRF/T adhesive formulations with time after initial resin formulation is shown in FIG. 3 and in Table 11. The adhesives were formulated with RP50 powdered hardener and no substantial loss in adhesive performance was observed over the 6 month timeframe. Initial adhesive performance was pH dependent with the more alkaline pH adhesives giving greater bonding performance. For comparison to adhesives prepared with the paraformaldehyde-based powdered hardener, adhesives were also formed with "Y" hardener. All of the adhesives prepared with the "Y" hardener 129 days after resin formulation attained the BS/EN1204 cold water soak pass mark, the adhesive prepared from 50/50 PRF/T at pH 6.8 with "Y" hardener showing little change in adhesive performance a further 22 days after resin formulation.

INDUSTRIAL APPLICATION

It will be appreciated from the discussion above that, in use, the present invention provides a hardener composition and a tannin-containing resin composition.

Advantageously, the resin is formulated at a neutral pH. This reduces the extent of self-polymerisation of the tannin component in the resin and results in a satisfactory shelf life.

The hardener composition may be mixed with a suitable resin, or the resin composition mixed with a suitable hardener to produce a cold set adhesive with useful potlife which is especially suited to the bonding of wood articles. The adhesive may be used in the production of various composite products including but not limited to: plywood; laminated veneer lumber (LVL); particleboard; medium density fibreboard (MDF); oriented strand board (OSB); and parallam. The adhesive may also be used in the production of remanufactured wood products which utilise fingerjointing and laminating techniques including but not limited to: glulam beams; posts; furniture; and pallets.

When formulated with appropriate viscosity, the hardener is especially suited to use in an in-line gluing operation where no batch mixing is required, and the adhesive is mixed immediately prior to application. In such applications the hardener, when mixed with a suitable resin, gives an adhesive with a reasonable gel time.

It is not the intention to limit the scope of the invention to the abovementioned examples only. As would be appreciated by a skilled person in the art, many variations are possible without departing from the scope of the invention (as set out in the accompanying claims).

REFERENCES

1. R. E. Kreibich and R. W. Hemingway, 1989: "Tannin-based adhesives for fingerjointing wood". *Adhesives from Renewable Resources*, Eds R. W. Hemingway, and A. H. Conner, American Chemical Society, Washington. Chapter 15.
2. A. Pizzi, 1983: *Wood Adhesives, Chemistry and Technology*, Ed. A. Pizzi, Vol. 1, Marcel Dekker, New York.
3. B. Dix and R. Marutzky, 1984: "Tannin extracts from spruce and pine barks". *J. Appl. Polym. Sci.* Vol. 40 91-100.
4. Y. Yazaki, 1985: "Improved ultrafiltration of extracts from *Pinus radiata* bark". *Holzforschung* Vol. 39 79-83.
5. A. Pizzi and A. Stephanou, 1994: "Fast vs. slow-reacting non-modified tannin extracts for exterior particleboard adhesives". *Holz Roh Werkstoff* Vol. 52 218-222.
6. L. Zhao, B. Cao, F. Wang and Y. Yazaki, 1994: "Chinese wattle tannin adhesives suitable for producing exterior grade plywood in China". *Holz Roh Werkstoff* Vol. 52 113-118.
7. J. Gonzalez and A. Pizzi, 1996: "Influence of preparation procedure on pine tannin-based cold-set glulam adhesives". *Holz Roh Werkstoff* Vol. 54 389-392.
8. R. E. Kreibich and R. W. Hemingway, 1987: "Condensed tannin-sulfonate derivatives in cold-setting wood-laminating adhesives". *For. Prod. J.* Vol. 37 43-46.
9. E. von Leyser and A. Pizzi, 1990: "The formulation and commercialisation of pine tannin adhesives in Chile". *Holz Roh Werkstoff* Vol. 48 25-29.
10. R. E. Kreibich, R. W. Hemingway and W. T. Nearn, 1993: "Application of honeymoon cold-set adhesive systems for structural end joints in North America". *For. Prod. J.* 43 45-48.
11. A. Pizzi, D. du T. Rossouw, W. E. Knuffel and M. Singmin, 1980: "Honeymoon phenolic and tannin-based fast-setting adhesive systems for exterior grade fingerjoints". *Holzforschung und Holzverwertung* Vol. 32 140-150.
12. A. Pizzi and F. A. Cameron, 1989: "Fast-setting adhesives for fingerjointing and glulam". *Wood Adhesives, Chemistry and Technology*, Ed. A. Pizzi, Vol. 2, Marcel Dekker, New York.
13. R. E. Kreibich and R. W. Hemingway, 1985: "Condensed tannin-resorcinol adducts in laminating adhesives". *For. Prod. J.* Vol. 35 23-25.
14. Wu, G., 1999: "Oxazolidine-based hardeners for the room temperature cure of resorcinol resins in the bonding of wood articles". U.S. Pat. No. 5,858,553.
15. Wu, G., 1999: "Oxazolidine-based hardeners for the room temperature cure of resorcinol resins in the bonding of wood articles—II". U.S. Pat. No. 5,912,317.
16. D. L. Connolly, 1993: "Tannin extraction". U.S. Pat. No. 5,238,680.
17. P. C. Crammond and M. E. Wilcox, 1992: in Washington State University Pullman Particleboard Symposium. 172.
18. V. J. Sealy-Fisher and A. Pizzi, 1992: "Increased pine tannins extraction and wood adhesives development by phlobaphenes minimisation". *Holz Roh Werkstoff* Vol. 50 212.

19. A. A. Marra, 1992: *Technology of wood bonding, principles in practice*, Van Norstand Rheinhold, New York.
20. J. R. Parker, J. B. M. Taylor, D. V. Plackett and T. D. Lomax, 1997: "Method of joining wood". U.S. Pat. No. 5,674,338.
21. BS/EN1204:1993 Type MR phenolic and aminoplastic synthetic resin adhesives for wood.
22. Japanese Agricultural Standard for Structural Glued Laminated Timber (Notification No. 111) 1996.
23. American Standard Test Method (ASTM) D ASTM 4688-95. Standard Test Methods for Evaluating Structural Adhesives for Fingerjointing Lumber.
24. A/NZS Standard 4063.

The invention claimed is:

1. A hardener composition comprising: 2-amino-2-(hydroxymethyl)-1,3-propanediol or a functional equivalent thereof; formaldehyde; one or more solvents; and water; wherein the hardener composition has a neutral pH.

2. A hardener composition as claimed in claim 1 wherein the molar ratio of 2-amino-2-(hydroxymethyl)-1,3-propanediol or functional equivalent thereof to formaldehyde is between about 1:3.5 and about 1:1.2.

3. A hardener composition as claimed in claim 1 wherein the molar ratio of 2-amino-2-(hydroxymethyl)-1,3-propanediol or functional equivalent thereof to formaldehyde is between about 1:2.5 and about 1:1.5.

4. A hardener composition as claimed in claim 1 wherein the molar ratio of 2-amino-2-(hydroxymethyl)-1,3-propanediol or functional equivalent thereof to formaldehyde is about 1:2.

5. A hardener composition as claimed in claim 1 wherein the solvent comprises poly(ethylene glycol), 1,2-ethanediol or a mixture thereof.

6. A hardener composition as claimed in claim 1 further comprising a viscosity modifier.

7. A hardener composition as claimed in claim 6 wherein the viscosity modifier is selected from the group consisting of: carboxymethylcellulose; hydroxyethyl cellulose; hydroxypropyl cellulose; methyl cellulose; polyols; acrylics; and hydrolysed polyvinyl acetates.

8. A hardener composition as claimed in claim 1 further comprising a filler.

9. A hardener composition as claimed in claim 8 wherein the filler is selected from the group consisting of: clays; silicates; diatomaceous earth; nut flours; bark flours; and cereal flours.

10. A hardener composition as claimed in claim 1 comprising, by weight: about 25 to about 50% 2-amino-2-(hydroxymethyl)-1,3-propanediol; about 5 to about 30% paraformaldehyde; about 15 to about 40% of one or more solvents; and about 5 to about 40% water.

11. A hardener composition as claimed in claim 1 comprising, by weight: about 26 to about 46% 2-amino-2-(hydroxymethyl)-1,3-propanediol; about 8 to about 28% paraformaldehyde; about 17 to about 37% of one or more solvents; and about 9 to about 29% water.

12. A hardener composition as claimed in claim 1 comprising, by weight: about 36% 2-amino-2-(hydroxymethyl)-1,3-propanediol; about 18% paraformaldehyde; about 27% ethylene glycol; and about 19% water.

13. A resin composition comprising: pine bark tannin (PBT); a suitable phenol-resorcinol-formaldehyde (PRF) resin; and one or more diluents or solvents; wherein the composition has a neutral pH.

14. A resin composition as claimed in claim 13 wherein the diluent or solvent comprises water.

15. A resin composition as claimed in claim 14 wherein the diluent or solvent further comprises an alcohol, glycol or polyol, or a mixture thereof.

16. A resin composition as claimed in claim 13 further comprising one or more additives selected from the group consisting of: surfactants; defoamers; flow agents; and viscosity modifiers.

17. A resin composition as claimed in claim 13 comprising, by weight: about 20 to about 40% PBT; about 10 to about 30% PRF solids; and about 40 to about 60% water.

18. A resin composition as claimed in claim 13 comprising, by weight: about 25 to about 38% PBT; about 12 to about 25% PRF solids; and about 45 to about 55% water.

19. A resin composition as claimed in claim 13 comprising, by weight: about 24.6% PBT; about 47.5% water; about 1.5% of 40% aqueous sodium hydroxide; about 24.6% PRF resin solids; and about 1.8% citric acid.

20. A process for preparing a resin composition as claimed in claim 13 comprising the steps of:
    (a) dissolving PBT in one or more diluents or solvents;
    (b) adjusting the pH of the PBT solution to between about 8.0 and about 8.5 with a suitable base;
    (c) adding a suitable PRF resin; and
    (d) after a suitable time, adjusting the pH of the resin to neutral with a suitable acid.

21. A process as claimed in claim 20 wherein the base is an alkali metal hydroxide or an alkali metal carbonate.

22. A process as claimed in claim 21 wherein the base is sodium hydroxide.

23. A process as claimed in claim 20 wherein the acid is an organic acid.

24. A process as claimed in claim 23 wherein the acid is citric acid.

25. A process as claimed in claim 20 wherein the pH is adjusted to neutral within an hour of adding the PRF resin.

26. An adhesive comprising a resin and a hardener composition, wherein the hardener composition comprises: 2-amino-2-(hydroxymethyl)-1,3-propanediol or a functional equivalent thereof; formaldehyde; one or more solvents; and water; and wherein the hardener composition has a neutral pH.

27. An adhesive as claimed in claim 26 wherein the resin is selected from the group consisting of: novalak; PRF resin; phenol-formaldehyde resin; resorcinol resin; resorcinol-formaldehyde resin; reactive extrusion resin containing phenol, resorcinol or tannin; tannin resin; tannin-formaldehyde resin; tannin-phenol-formaldehyde resin; and tannin-UFC (urea formaldehyde concentrate) resin.

28. An adhesive comprising a hardener and a resin composition, wherein the resin composition comprises: pine bark tannin (PBT); a suitable phenol-resorcinol-formaldehyde (PRF) resin; and one or more diluents or solvents; and wherein the resin composition has a neutral pH.

29. An adhesive as claimed in claim 28 wherein the hardener is selected from the group consisting of: powdered formaldehyde-based hardeners; liquid formaldehyde-based hardeners; and oxazolidine hardeners.

30. An adhesive comprising a hardener and a resin composition, wherein the hardener composition comprises: 2-amino-2-(hydroxymethyl)-1,3-propanediol or a functional equivalent thereof; formaldehyde; one or more solvents; and water; and wherein the hardener composition has a neutral pH; and wherein the resin composition comprises: pine bark tannin (PBT); a suitable phenol-resorcinol-formaldehyde (PRF) resin; and one or more diluents or solvents; and wherein the resin composition has a neutral pH.

* * * * *